Sept. 30, 1969   R. E. BETTS   3,469,871
RELEASABLE LOCKING DEVICE
Filed Aug. 14, 1967   2 Sheets-Sheet 1
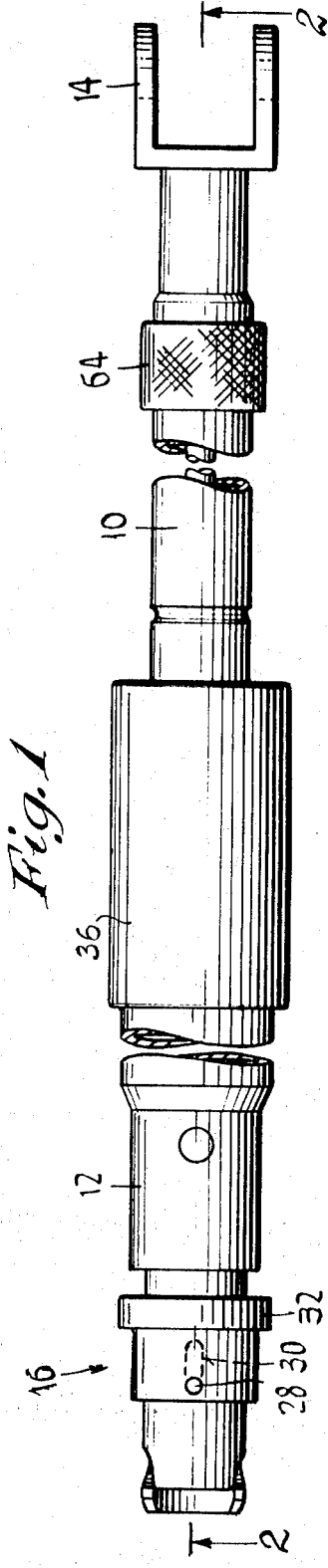
INVENTOR.
Robert E. Betts
AGENT Sept. 30, 1969     R. E. BETTS     3,469,871
RELEASABLE LOCKING DEVICE
Filed Aug. 14, 1967     2 Sheets-Sheet 2
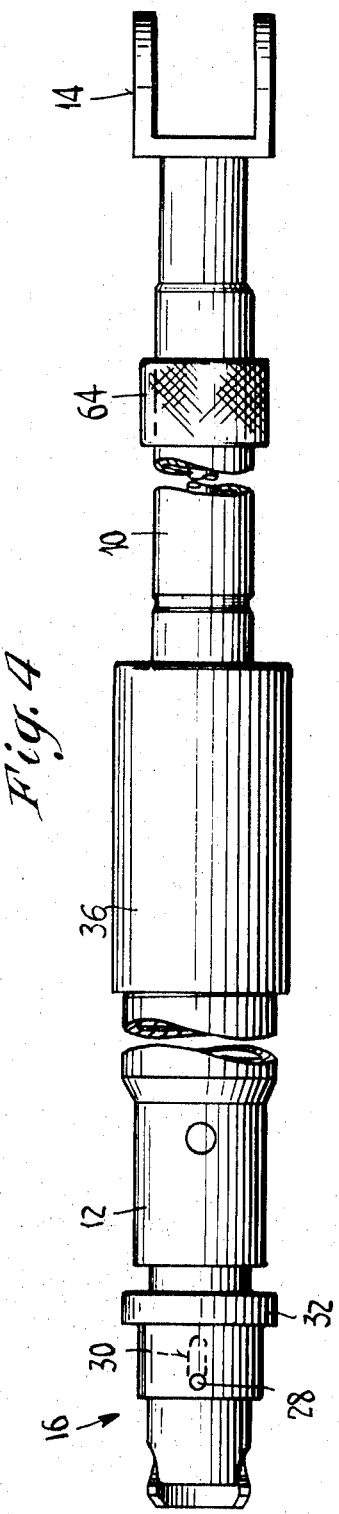
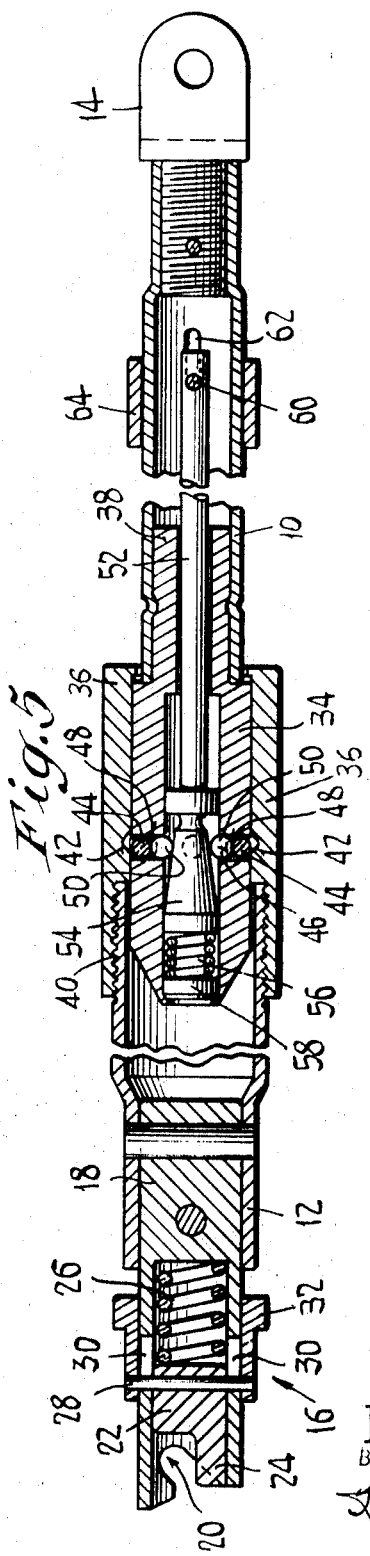
INVENTOR.
Robert E. Betts
BY
AGENT ns and the entire arrangement is especially small and compact while at the same time providing increased load-carrying capacity.

Other features and advantages will hereinafter appear.

In the drawings:

FIG. 1 is a fragmentary side elevational view of an extendable and collapsible strut embodying the locking device of the invention, the strut being shown in the extended position.

FIG. 2 is a fragmentary axial sectional view of the locking device and extended strut, taken on the line 2—2 of FIG. 1.

FIG. 3 is a transverse section of the locking device, taken on the line 3—3 of FIG. 2.

FIG. 4 is a fragmentary side elevational view of the strut similar to the view of FIG. 1 but showing the strut in collapsed position.

FIG. 5 is an axial sectional view like that of FIG. 2, but showing the strut in the collapsed condition.

FIG. 6 is a side elevational view of one of the locking dogs of the locking device.

FIG. 7 is a section, taken on the line 7—7 of FIG. 6.

Considering first FIGS. 1 and 2, the strut illustrated therein comprises an inner strut member 10 and an outer strut member 12, the latter being larger than the member 10 in diameter, in order to enable the inner member to easily fit or telescope into the outer member.

One end of the inner strut member 10 carries a bifurcated fitting 14 by which it may be pivotally secured to an associated structure (not shown). An end of the outer member 12 has a releasable clasp fitting 16 which is in general similar to that disclosed and described in my U.S. Patent No. 3,280,439.

The fitting 16 comprises an outer tubular part 18 having at one end and in its opposite walls a pair of similar diagonal slots 20. Slidable longitudinally in the member 18 is a locking piece 22 having a forwardly projecting portion 24 adapted to occupy a portion of the space disposed between the slots 20. The locking piece 22 is biased forward or outward by a helical compression spring 26, and is restrained by a cross pin 28 passing through it and through longitudinal slots 30 in the outer member 18.

Slidable on the exterior of the member 18 is a release collar 32 to which the cross pin 28 is affixed. By such construction, shifting of the release collar 32 from left to right as viewed in FIGS. 1 and 2 will retract the locking piece 22 whereby the portion 24 thereof will be removed from the space located between the slots 20. For such condition, a bar (not shown) of a cooperable structure can be admitted in the slots 20, whereupon advance of the locking piece 22, 24 will block the exit area of the slots 20, retaining the bar in said slots.

Further details in connection with the releasable fastener 16 can be had by referring to my above identified patent.

The inner and outer strut members 10, 12 are rigidly connected respectively with inner and outer tubular telescopic lock members 34, 36 as seen in FIG. 2. The inner lock member 34 has a reduced hub portion 38 fitted in and secured to the adjoining end of the inner strut member 10. The outer lock member 36 has an enlarged bore 40 receiving the adjoining end of the outer strut member 12, said members being rigidly affixed to each other.

The tubular inner member 34 is hereinafter also referred to as a plug-like member, since like a plug it is received and axially slidable in the outer locking member 36 and also in the outer strut member 12. The outer locking member 36 has an internal circumferentially extending annular groove 42 of semicircular cross-sectional shape which is adapted in accordance with the present invention to accommodate a pair of arcuate locking dogs 44. The dogs 44 are, in accordance with the invention, also disposed in a circumferentially extending annular groove 46 in the exterior of the inner lock member 34. With such construction, as provided by the invention, the side walls of the exterior groove 46 constitute guides for the locking dogs 44 and prevent canting of the same, particularly when the dogs are partially received in the internal groove 42 of the outer lock member 36. This constitutes an important feature of the invention.

By virtue of the locking dogs 44 being of arcuate configuration, in conjunction with the exterior groove 46 of the inner lock member 34 there is had an extremely compact construction capable of having a relatively small diameter. At the same time, relatively large surfaces of the locking dogs can be simultaneously engaged with the walls of both the grooves 42 and 46, providing for an appreciably large load-carrying capacity.

The inner lock member 34 has a plurality of apertures 48 extending radially through its walls and communicating with the exterior groove 46. In the apertures 48, force-transmitting balls 50 are disposed for engagement with the inner peripheral surfaces of the locking dogs 44. It will be seen that each locking dog 44 is engaged by two of the balls 50.

For the purpose of actuating the balls 50 and the locking dogs 44 there is provided an elongate release member or rod 52, having a conical portion 54 which is engageable with the balls 50. The rod 52 is longitudinally slidable in the inner lock member 34, and is biased from left to right as viewed in FIG. 2 by a helical compression spring 56 which is engaged by a plug 58 affixed to the end of the inner lock member 34.

The release rod 52 extends through the inner strut member 10 and has a cross pin 60 which passes through slots 62 of the strut member and is affixed to a slidable release collar 64 movably carried by the exterior of the member.

It will now be understood that by such construction the spring 54 normally urges the release member 52 to the right, whereby the conical portion 54 thereof urges the balls 50 radially outward, driving outward the locking dogs 44. In consequence of such action, the center portions of the locking dogs 44 will occupy the interior groove 42 of the outer lock member 36, thereby securing the outer and inner lock members 36, 34 against relative movement and permitting the dogs to have an adjusting rocking movement about said center portions. This will enable the balls 50 to adjust to the conical portion 54 of the release member, resulting in equalization of the forces on the balls. Such equalization minimizes the likelihood of any one ball being loose and rattling under vibration, particularly since the wire-like nature of the dogs 44 make them capable of a slight amount of springiness.

The interior groove 42 is semicircular in cross-sectional shape, and the dogs 44 are of circular cross section. Accordingly, the groove is capable of camming the dogs inward if the dogs are free to thus move.

When the release collar 64 is shifted from right to left it will cause a corresponding movement of the release bar 52, enabling the balls 50 to shift radially inward. The locking dogs 44 can now shift radially inward whereupon they will leave the internal groove 42 of the outer lock member 36 in response to relative longitudinal force existing between the members 34 and 36. As a consequence, the outer and inner lock members will now be released one from the other, and the inner member together with the inner strut part 10 can shift or telescope into the outer strut member 12, as seen in FIG. 5.

The conical portion 54 of the release rod 52 at its small-diameter end adjoins an annular round-bottom groove 66 provided in the rod, said groove being arranged to accommodate the balls 50 when the rod is shifted from right to left and attains the releasing position. The balls 50 will be retained in the groove 66 by the locking dogs 44 as the latter slide along the inner wall of the outer strut member 12. Thus, the release rod 52 and the release collar 64 will be retained in a releasing position at all times except when the strut is completely extended to the position shown in FIGS. 1 and 2. At the termination of the extending movement of the strut from its collapsed condition, as the locking dogs 44 reach the internal groove 42, the compression spring 58 will be able to dislodge the balls 50 from the groove 66, said balls now riding up on the conical portion 54 and forcing the locking dogs 44 into the internal groove 42. A relatively quick action of the release rod 52 and release collar 64 occurs as this happens.

For the locking condition of FIGS. 1 and 2, the end portions of the arcuate locking dogs 44 will occupy the exterior groove 46 of the inner lock member, and the middle or center portions of the locking dogs will occupy the internal groove 42 of the outer lock member 46. The locking dogs 44 by such disposition will be prevented from canting, and instead relatively large areas of such dogs will be engaged with both the inner groove 42 and the exterior groove 46. In consequence, the lock comprising the dogs 44 and associated grooves can withstand considerable working forces without the likelihood of failure, as compared with locking devices where small spherical balls are depended on to provide the abutment or locking means.

In spite of the relatively large surfaces which the locking dogs 44 present to the locking members 34, 36 it is seen that the organization is capable of being reduced to relatively small diametric measurements due to the compactness, simplicity and specific shape of the cooperable elements. Accordingly, a small diameter locking device is made possible while still enabling relatively large forces to be handled. The locking device is seen to be relatively simple, economical to fabricate and is well adapted for use in connection with telescopic strut members such as the inner and outer members 10, 12.

It will now be seen that in accordance with the foregoing I have provided an improved collapsible strut construction which is featured by strong, small-diameter locking means operable from an end of the strut, said means being resistant to vibration and rattle due to the equalization of forces on the balls. The improved locking device as above set forth is easily actuated, reliable and foolproof, simple, constituted of relatively few parts that are economical to fabricate and assemble, resistant to weather and damage, adaptable to a wide variety of uses and operable under adverse conditions of use.

Variations and modifications may be made and portions of the improvement may be used without others.

I claim:

1. A releasable locking device comprising, in combination:
 (a) a plug-like inner member having an axial bore,
 (b) a tubular outer member in which the inner member is slidable axially,
 (c) said outer member having an internal circumferentially-extending annular groove,
 (d) an elongate release member movable axially in the bore of the inner member between locking and releasing positions,
 (e) said release member having a conical portion disposed within said inner member,
 (f) said inner member having a pair of circumferentially spaced-apart apertures extending through its wal land disposed adjacent the conical portion of the release member,
 (g) a pair of balls disposed respectively in the apertures of the inner member for engagement with the conical portion of the release member to be shifted radially outward in response to longitudinal movement of the release member in one direction toward the locking position,
 (h) opposite longitudinal movement of the release member enabling the balls to shift radially inward, (i) an elongate, arcuate locking dog adapted to be received in part in the internal annular groove of the outer member and having a radius of curvature smaller than that of the annular groove whereby it can rock when the center portion is engaged in the groove, said dog occupying an outer portion of the aperture of the inner member and having the inner arcuate surface thereof adjacent its ends engaging the balls in said apertures whereby unequal forces exerted by the balls against the dog will rock the latter to effect force equalization, and (j) means on said inner member, confining side portion of the locking dog to prevent the latter from canting when occupying said internal groove.

2. The invention as defined in claim 1, wherein:
(a) said locking dog is of circular cross section and is formed from round wire capable of bending,
(b) said exterior annular groove having a semicircular cross-sectional shape, and
(c) said internal annular groove having a semicircular cross-sectional shape.

3. The invention as defined in claim 1, wherein:
(a) the inner member has two additional apertures through its walls, all said apertures being disposed in a single transverse plane, with arcuate spacing of 90°,
(b) a second arcuate locking dog disposed and rockable in the annular groove of the outer member and identical to the first-mentioned dog,
(c) said locking dogs comprising substantially half-circles,
(d) said inner member having an exterior annular groove communicating with said apertures and in which the locking dogs are disposed,
(e) two additional balls, disposed respectively in said two additional apertures,
(f) said four balls engaging the insides of the locking dogs and also said conical portion of the release member and transmitting force from the latter to the dogs.

4. The invention as defined in claim 1, wherein:
(a) said inner member has an exterior annular groove in which the locking dog is disposed,
(b) said locking dog having a radius of curvature which, at its greatest, is not substantially in excess of the radius of curvature of the outer periphery of the inner member at a location adjacent the exterior grove thereof.

5. The invention as defined in claim 1, wherein:
(a) tubular axial extensions are provided on said inner and outer member, the extension on the outer member being adapted to receive within it the inner member and also the extension on the same, thereby to form a collapsible strut,
(b) said release member extending through the extion on the inner member,
(c) a manually-operable collar slidable on the inner member extension, and
(d) tie means passing through the inner member extension, tying together the collar and release member for simultaneous movement.

References Cited

UNITED STATES PATENTS

| 1,056,076 | 3/1913 | Wiard. | |
|---|---|---|---|
| 1,510,618 | 10/1924 | Bell. | |
| 2,628,111 | 2/1953 | Smalline | 285—310 |
| 3,107,933 | 10/1963 | Royster. | |

CARL W. TOMLIN, Primary Examiner

WAYNE L. SHEDD, Assistant Examiner

U.S. Cl. X.R.

85—5; 287—58